(12) United States Patent
Kim et al.

(10) Patent No.: US 7,675,988 B2
(45) Date of Patent: Mar. 9, 2010

(54) APPARATUS AND METHOD FOR BEAMFORMING IN A MULTI-ANTENNA SYSTEM

(75) Inventors: Ho-Jin Kim, Seoul (KR); Ju-Ho Lee, Suwon-si (KR); Kwang-Bok Lee, Seoul (KR); Hyoung-Woon Park, Seongnam-si (KR); Ho Yang, Yongin-si (KR); Pandharipande Ashish, Yongin-si (KR); Sung-Jin Kim, Suwon-si (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 1235 days.

(21) Appl. No.: 11/180,264

(22) Filed: Jul. 13, 2005

(65) Prior Publication Data

US 2006/0039494 A1 Feb. 23, 2006

(30) Foreign Application Priority Data

Jul. 13, 2004 (KR) ...................... 10-2004-0054565

(51) Int. Cl.
H04B 7/02 (2006.01)
(52) U.S. Cl. ........................................ 375/267; 375/299
(58) Field of Classification Search ................. 375/260, 375/267, 299
See application file for complete search history.

(56) References Cited

U.S. PATENT DOCUMENTS 6,662,024 B2 12/2003 Walton et al.
2004/0196919 A1* 10/2004 Mehta et al. ................ 375/267
2005/0075081 A1* 4/2005 Catreux-Erceg et al. ...... 455/78
2008/0108310 A1* 5/2008 Tong et al. .................... 455/69

FOREIGN PATENT DOCUMENTS

| JP | 2001-036443 | 2/2001 |
| JP | 2001-044900 | 2/2001 |
| JP | 2004-166216 | 6/2004 |
| WO | WO 03/034614 | 4/2003 |
| WO | WO 03/094387 | 11/2003 |

OTHER PUBLICATIONS

Heath, Jr. et al., Antenna Selection for Spatial Multiplexing Systems With Linear Receivers, IEEE Communications Letters, vol. 5, Issue 4, 2001.
Samsung and SNU: Antenna Selection Based MIMO, 3GPP TSG RAN WG1 #38 meeting, Aug. 20, 2004.
Samsung and SNU, PURC Simulation Considering S-PARC and 4-TxAA Mode-1 Signaling, 3GPP TSG RAN WG1, #6 meeting, Feb. 20, 2004.

* cited by examiner

*Primary Examiner*—Chieh M. Fan
*Assistant Examiner*—Freshteh N Aghdam
(74) *Attorney, Agent, or Firm*—The Farrell Law Firm, LLP

(57) ABSTRACT

An apparatus and method for performing beamforming or transmitting a plurality of bit streams output through Adaptive Modulation and Coding (AMC) via a plurality of transmission antennas in a base station using a multi-antenna scheme. The apparatus and method include classifying the plurality of transmission antennas into a plurality of transmission antenna groups; selecting one of the transmission antenna groups depending on a group selection signal being fed back from a mobile station; and outputting each of the bit streams to its associated transmission antenna among the transmission antennas constituting the selected transmission antenna group.

10 Claims, 7 Drawing Sheets

APPARATUS AND METHOD FOR BEAMFORMING IN A MULTI-ANTENNA SYSTEM

PRIORITY

This application claims priority under 35 U.S.C. § 119 to an application entitled "Apparatus and Method for Beamforming in a Multi-Antenna System" filed in the Korean Intellectual Property Office on Jul. 13, 2004 and assigned Serial No. 2004-54565, the contents of which are incorporated herein by reference.

BACKGROUND OF THE INVENTION

1. Field of the Invention

The present invention relates generally to an apparatus and method for beamforming in a multi-antenna system, and in particular, to an apparatus and method for performing beamforming depending on feedback information.

2. Description of the Related Art

Mobile communication systems are evolving into high-speed, high-quality wireless packet data communication systems capable of providing data service and multimedia service beyond the early voice-oriented service. The ongoing standardization on High Speed Downlink Packet Access (HSDPA) being led by $3^{rd}$ Generation Partnership Project (3GPP) and 1× Evolution Data and Voice (EV-DV) being led by $3^{rd}$ Generation Partnership Project-2 (3GPP2) are efforts to find a solution for a high-speed, high-quality wireless packet data transmission service at 2 Mbps or higher in a $3^{rd}$ generation (3G) mobile communication system. A $4^{th}$ generation (4G) mobile communication system aims at providing a high-speed, high-quality multimedia service at a rate much higher than that of the 3G mobile communication system.

Multipath interference, shadowing, propagation attenuation, time-varying noise, and interference in a wireless channel environment are factors deteriorating the high-speed, high-quality data service. Therefore, much research has been conducted on techniques for overcoming these factors. Error control coding technique and a multi-user diversity scheduling are typical techniques used to improve the quality of service.

The multi-user diversity scheduling technique detects channel conditions of mobile stations requiring packets, based on feedback information, and preferentially transmits a packet to the mobile station having the best channel condition, thereby acquiring a diversity effect including a signal-to-noise ratio gain. A diversity order indicating a level of the diversity gain corresponds to the number of mobile stations that simultaneously require packets.

The multi-antenna technique uses a spatial domain as an additional resource to acquire a higher data rate. The multi-antenna technique is implemented based on a multi-antenna system in which a transmitter and a receiver both have multiple antennas, and a beamforming technique.

The beamforming technique arranges a plurality of transmission antennas and separately adjusts weights of signals for each of the transmission antennas, so that the same frequency-domain signals can have different gains according to their directions. The beamforming technique, as it uses a geometric, spatial axis, extends an operating frequency bandwidth through a nulling process. In other words, the beamforming technique can overcome the limitation of frequency resources.

The beamforming technique is popularly used for improving a signal-to-interference plus noise ratio (SINR) by reducing interference signals on the same channel in a wireless communication system operating under the cell plan such as a mobile communication network or a wireless local loop (WLL).

The beamforming technique is implemented on the assumption that channel conditions can be correctly detected. Therefore, for the beamforming technique, there is a need for feedback of information based on which a transmission side can estimate channel conditions or a reception side can detect channel conditions. Preferably, the beamforming technique detects channel conditions based on feedback information from the reception side. The feedback information, which is channel information, represents channel responses between the transmission antennas and the reception antennas. The channel information increases with the number of transmission/reception antennas.

Therefore, if it is desired to detect correct channel conditions or the number of transmission/reception antennas increases, the required amount of the feedback information increases. The increase in the amount of the feedback information increases the amount of radio resources used for transmitting the feedback information, causing an increase in radio traffic. In addition, the increase in the amount of the feedback information increases the number of calculations for beamforming, and the increase in the number of the calculations increases a load on the system.

For these reasons, there is a demand for a plan to minimize the amount of required feedback information, without affecting performance that can be obtained by the beamforming technique.

SUMMARY OF THE INVENTION

To meet the foregoing demands, the present invention provides an apparatus and method for performing beamforming with a minimum amount of feedback information in a multi-antenna system.

In addition, the present invention provides a beamforming apparatus and method for classifying a plurality of transmission antennas into a plurality of groups, and separately allocating weights to the groups selected based on feedback information in a multi-antenna system.

Further, the present invention provides a beamforming apparatus and method for classifying a plurality of transmission antennas into a plurality of groups, and allocating the same weight to the transmission antennas in the same group in a multi-antenna system.

Moreover, the present invention provides a beamforming apparatus and method for classifying a plurality of transmission antennas into a plurality of groups, and allocating weights such that only one of the plurality of groups can be selected based on feedback information, in a multi-antenna system.

Furthermore, the present invention provides a beamforming apparatus and method for minimizing the amount of feedback information, while guaranteeing a maximum amount for transmission data, in a multi-antenna system.

Furthermore, the present invention provides a beamforming apparatus and method for performing antenna selection based on feedback information in a multi-antenna system.

Furthermore, the present invention provides a beamforming apparatus and method for determining a transmission antenna for each signal stream depending on feedback information in a multi-antenna system.

Furthermore, the present invention provides a beamforming apparatus and method for allocating weights for signal streams to be separately transmitted through transmission antennas based on feedback information in a multi-antenna system.

According to one aspect of the present invention, there is provided a method for performing beamforming for transmitting a plurality of bit streams output through Adaptive Modulation and Coding (AMC) via a plurality of transmission antennas in a base station using a multi-antenna scheme. The method includes the steps of classifying the plurality of transmission antennas into a plurality of transmission antenna groups; selecting one of the transmission antenna groups depending on a group selection signal being fed back from a mobile station; and outputting each of the bit streams to its associated transmission antenna among the transmission antennas constituting the selected transmission antenna group.

According to another aspect of the present invention, there is provided an apparatus for performing beamforming in a base station using a multi-antenna scheme. The apparatus includes a general signal processor for multiplexing one bit steam into a plurality of bit streams, and performing Adaptive Modulation and Coding (AMC) on each of the plurality of bit streams; and a spatial signal processor for classifying a plurality of transmission antennas into a plurality of transmission antenna groups, selecting one of the transmission antenna groups depending on a group selection signal being fed back from a mobile station, and outputting each of the bit streams to its associated transmission antenna among the transmission antennas constituting the selected transmission antenna group.

According to yet another aspect of the present invention, there is provided a method for performing beamforming for transmitting a plurality of bit streams output through Adaptive Modulation and Coding (AMC) via a plurality of transmission antennas in a base station using a multi-antenna scheme. The method includes the steps of receiving feedback information from a mobile station; acquiring weight selection information from the feedback information, and selecting a predetermined weight matrix depending on the weight selection information; and multiplying the plurality of bit streams by a weight uniquely allocated to a transmission antenna group according to the selected weight matrix, and outputting the bit streams to their associated transmission antenna group. Preferably, the transmission antenna group has as many transmission antennas as the number of the bit streams, and the same weights are allocated to transmission antennas constituting the same transmission antenna group.

According to still another aspect of the present invention, there is provided an apparatus for performing beamforming in a base station using a multi-antenna scheme. The apparatus includes a general signal processor for multiplexing one bit steam into a plurality of bit streams, and performing Adaptive Modulation and Coding (AMC) on each of the plurality of bit streams; and a spatial signal processor for classifying a plurality of transmission antennas into a plurality of transmission antenna groups, multiplying the plurality of bit streams by weights separately calculated for the plurality of transmission antenna groups depending on weight selection information being fed back from a mobile station, and outputting the bit streams to their associated transmission antenna group. Preferably, the transmission antenna group has as many transmission antennas as the number of the bit streams, and the same weights are allocated to transmission antennas constituting the same transmission antenna group.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention provides a scheme for minimizing the required amount of feedback information in the process of performing beamforming based on the feedback information from a reception side, i.e. a mobile station. To this end, the present invention proposes a scheme for classifying a plurality of transmission antennas into a plurality of groups (hereinafter referred to as "transmission antenna groups"), and separately allocating weights to the transmission antenna groups. For example, if there are 4 transmission antennas, the 4 transmission antennas are classified into two 2-transmission antenna groups in such a manner that transmission antennas having the minimum interference to each other are classified as the same transmission antenna group. That is, the transmission antennas spaced farthest from each other can be classified as one transmission antenna group. In this case, it is preferable to consider all of the transmission antenna groups instead of considering only a particular transmission antenna group.

The number of transmission antenna groups or the number of transmission antennas constituting each transmission antenna group is determined depending on the number of bit streams output through multiplexing. That is, if the number of bit streams output through multiplexing increases, the number of transmission antenna groups increases or the number of transmission antennas constituting each transmission antenna group increases.

The present invention defines feedback information on the foregoing assumption, and performs the beamforming technique depending on the newly defined feedback information. The feedback information will be defined such that efficient beamforming can be achieved with a minimum amount of the feedback information. To this end, the present invention allocates different weights to the transmission antenna groups and allocates the same weight to all of the transmission antennas constituting each transmission antenna group. In addition, by adjusting the weights, the present invention can allow only one of the transmission antenna groups to transmit data. In this manner, it is possible to select one of the transmission antenna groups.

A first embodiment of the present invention provides a beamforming apparatus and method for selecting a transmission antenna group depending on feedback information, and a second embodiment of the present invention provides a beamforming apparatus and method for allocating different weights to transmission antenna groups depending on the feedback information.

Figure 1:
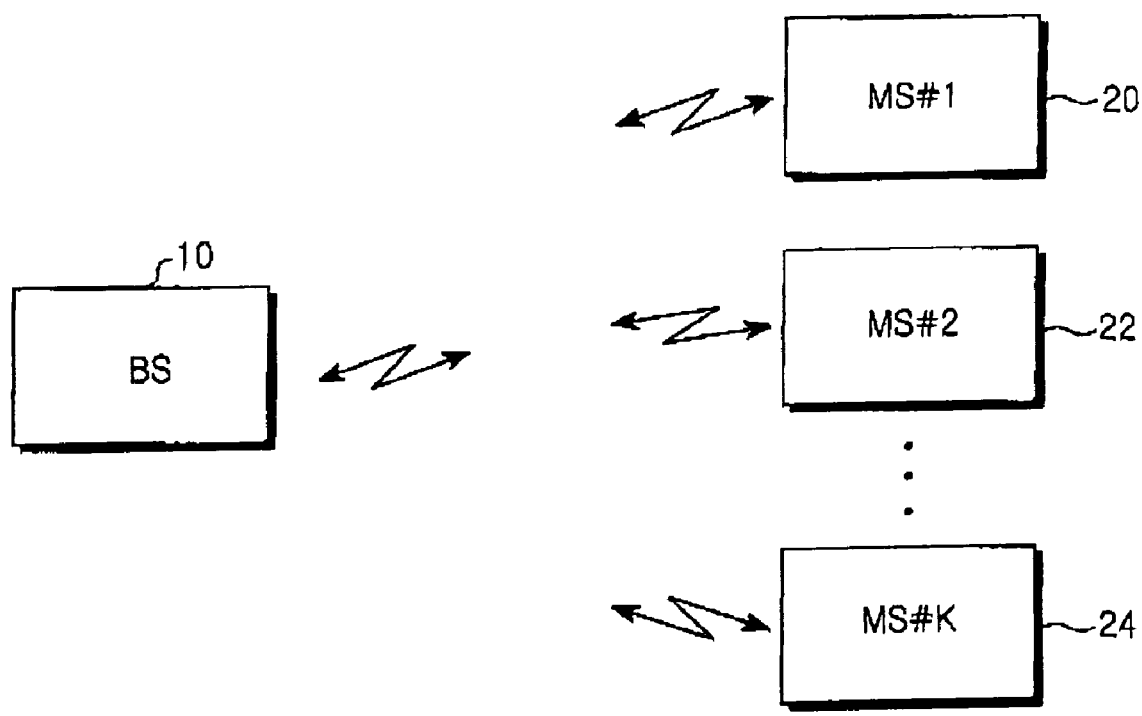
FIG. 1 illustrates an example of a multi-antenna system to which embodiments of the present invention is applicable.

FIG. 1 illustrates an example of a multi-antenna system to which embodiments of the present invention an applicable.

Referring to FIG. 1, a base station (BS; or Node B) 10, having a plurality of antennas, transmits and receives signal streams to/from mobile stations (MSs; or user equipments (UEs)) 20, 22 and 24 via the antennas. Although not illustrated in FIG. 1, the base station 10 has channels formed to the mobile stations 20, 22 and 24. For convenience, a channel formed to the first mobile station 20 will be referred to as a "first channel," a channel formed to the second mobile station 22 will be referred to as a "second channel," and a channel formed to the $K^{th}$ mobile station 24 will be referred to as a "$K^{th}$ channel."

The mobile stations 20, 22 and 24 transmit and receive signal streams to/from the base station 10 through their own channels formed to the base station 10. The mobile stations 20, 22 and 24 detect conditions of their own channels formed to the base station 10, and transmit the detected channel conditions to the base station as feedback information.

The base station 10 determines a coding scheme and/or a modulation scheme depending on the feedback information provided from the mobile stations 20, 22 and 24. According to embodiments of the present invention, the base station 10 selects a transmission antenna group depending on the feedback information to separately transmit signal streams to the mobile stations 20, 22 and 24, or allocates separate weights to the transmission antenna groups. The base station 10 transmits signal streams through transmission antennas of the selected transmission antenna group, or transmits the signal streams taking the allocated weights into account.

Figure 2:
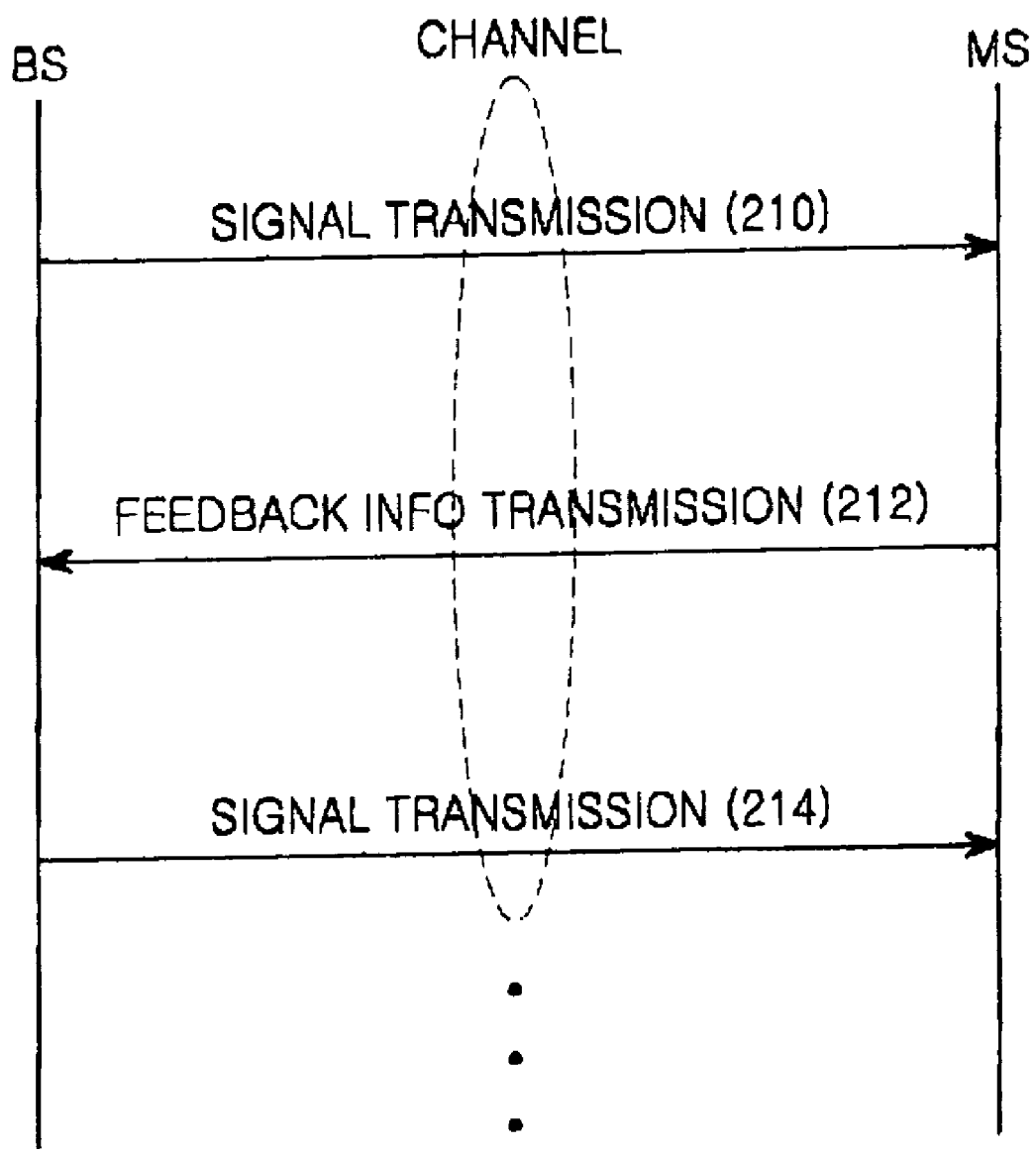
FIG. 2 illustrates a signaling process between a base station and a mobile station according to an embodiment of the present invention.

FIG. 2 illustrates a signaling process between a base station and a mobile station according to an embodiment of the present invention. Although a signaling process performed through one channel is shown in FIG. 2, it will be understood by those skilled in the art that the same signaling process is performed through all of the channels by the base station.

Referring to FIG. 2, in step 210, a base station transmits a signal to a particular mobile station (Signal Transmission Step). The signal transmitted by the base station is transmitted through a particular channel formed to the mobile station (Channelization Step).

The mobile station receives the signal transmitted through the particular channel (Signal Reception Step). The mobile station generates feedback information depending on the received signal (Feedback Information Generation Step). The feedback information is comprised of information required for performing power control and Adaptive Modulation and Coding (AMC) control on each of signal streams at a transmission side, and information required for performing beamforming at the transmission side. The information required for performing beamforming refers to information used for selecting a transmission antenna group or information used for allocating separate weights to transmission antenna groups. In step 212, the mobile station transits the generated feedback information to the base station (Feedback Information Transmission Step).

The base station receives the feedback information and analyzes the received feedback information. Based on the analyzed feedback information, the base station performs power control and AMC control on each of the signal streams, and selects a transmission antenna group for transmitting the signal stream or allocates separate weights to the transmission antenna groups (Feedback Information Processing Step). In step 214, the base station transmits the signal stream processed based on the feedback information to the mobile station through the selected transmission antenna group or the transmission antenna groups allocated different weights (Signal Transmission Step).

The process of transmitting/receiving signals and feedback information corresponding thereto in steps 210 to 214 is constantly performed between the base station and the mobile station.

Figure 3:
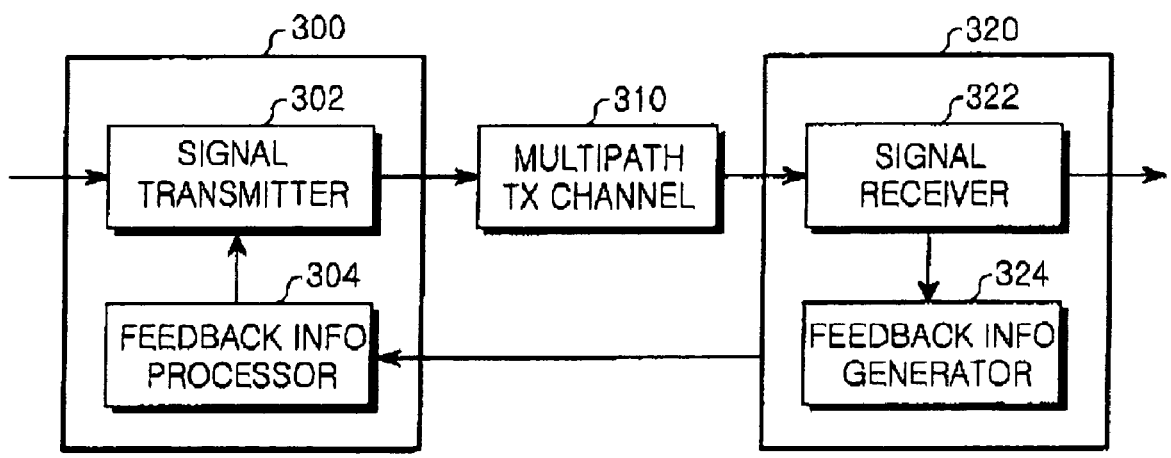
FIG. 3 illustrates a structure of a base station and a particular mobile station according to an embodiment of the present invention.

FIG. 3 illustrates a structure of a base station 300 and a particular mobile station 320 according to an embodiment of the present invention. In FIG. 3, a transmission side is assumed as a base station and a reception side is assumed as a mobile station. However, the present invention described below can be applied in the same manner even though the transmission side is assumed as a mobile station and the reception side is assumed as a base station.

Referring to FIG. 3, a signal transmitter 302 receives a signal stream to be transmitted and feedback information, and transmits the signal stream depending on the feedback information. The signal transmitter 302 includes a general signal processor and a spatial signal processor. The general signal processor classifies one signal stream to be transmitted to a mobile station into a plurality of signal streams, and separately performs power control and AMC control on the classified signal streams. The power control and AMC control on each of the classified signal streams is performed according to the feedback information.

The spatial signal processor performs beamforming on each of the signal streams from the general signal processor using one beamforming weight vector comprised of two factors. The beamforming is performed by grouping. The grouping-based beamforming multiplies the signal streams by weight vectors separately allocated to the transmission antenna groups. As for the weight vectors, different weight vectors are allocated to the transmission antenna groups, and the same weight vectors are allocated to the transmission antennas in a transmission antenna group. Each weight vector comprised of two factors can be provided from the mobile station though the feedback information. However, in order to directly receive the weight vector, a large amount of feedback information is required. Therefore, it is preferable that all available weight vectors are predefined in a transmission side (i.e. base station) and a reception side (i.e. mobile station) and only the indexes of the available weight vectors are provided as feedback information. In this manner, it is possible to transmit weight vector information with a lesser amount of feedback information.

The signals for the individual transmission antenna groups, output from the signal transmitter 302, are transmitted through a multipath transmission channel 310. The multipath transmission channel 310 includes multi-antenna and multi-path mobile communication channel characteristics. Therefore, the multipath transmission channel 310 applies the multi-antenna and multipath mobile communication channel characteristics comprised of gain, phase and delay to each of the output signals for the individual transmission antenna groups. In addition, noise is added to each of the signals. The noise-added signals will be received at each individual mobile station.

A signal receiver 322 constituting the mobile station 320 performs demodulation and decoding on the signal received through the multipath transmission channel 310 and outputs the signal component that the base station desired to transmit. A feedback information generator 324 receives the processing result of the signal receiver 322, and generates feedback information based on conditions of the multipath transmission channel 310 depending on the processing result. The generated feedback information is transmitted to the base station. The feedback information, as described above, includes information for general signal processing and information for spatial signal processing. The information for general signal processing refers to information required for performing power control and AMC control on signal streams. The information for spatial signal processing refers to information required for selecting a particular transmission antenna group or allocating separate weights to the transmission antenna groups.

The feedback information is provided to a feedback information processor 304 constituting the base station 300. The feedback information processor 304 analyzes the feedback information from the mobile station 320, and determines channel selection information, power control and AMC control information, and weight information of each individual transmission antenna group according to the analysis result. Thereafter, the feedback information processor 304 delivers the determined channel selection information, power control and AMC control information, and weight information of each individual transmission antenna group, to the signal transmitter 302.

A first embodiment of the present invention provides a beamforming apparatus and method for classifying a plurality of transmission antennas into a plurality of transmission antenna groups, selecting one of the transmission antenna groups depending on feedback information, and transmitting data using the selected transmission antenna group. Further, the first embodiment provides a method for generating the feedback information used for selecting one of the transmission antenna groups.

Figure 4:
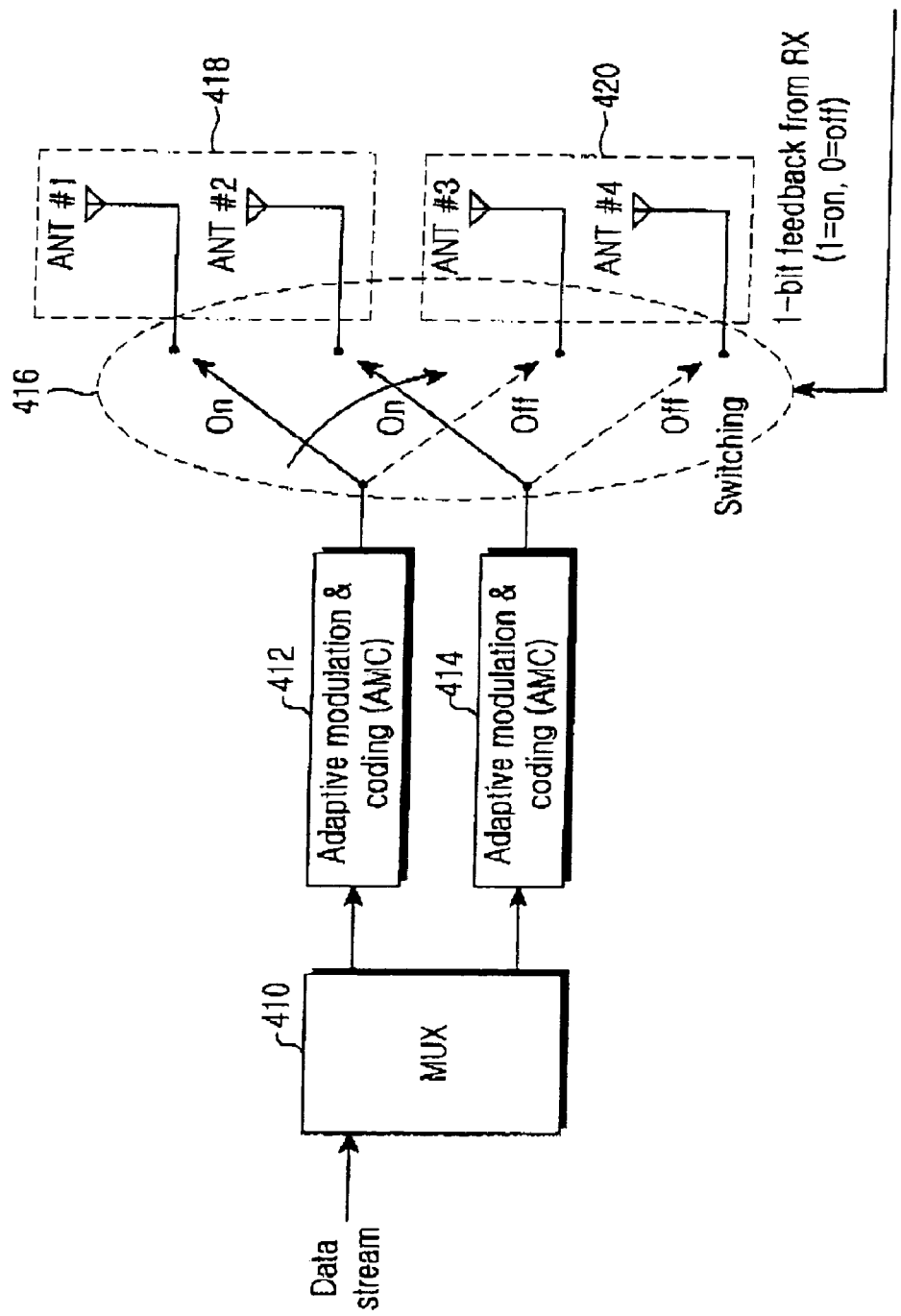
FIG. 4 is a diagram illustrating a detailed structure of a signal transmitter for selecting a transmission antenna group, through which signal streams will be transmitted, depending on feedback information.

FIG. 4 illustrates a detailed structure of a signal transmitter 302 for selecting a transmission antenna group, through which signal streams will be transmitted, depending on feedback information. The structure of FIG. 4 can be roughly divided into a general signal processor and a spatial signal processor. The general signal processor includes a multiplexer (MUX) 410 and two AMC units 412 and 414, and the spatial signal processor includes a switching unit 416 and transmission antenna groups 418 and 420.

Referring to FIG. 4, a data stream to be transmitted is input to the multiplexer 410. The multiplexer 410 classifies the data stream into at least two signal streams. The number of signal streams output from the multiplexer 410 corresponds to the number of AMC units. The number of AMC units corresponds to the number of transmission antennas constituting one transmission antenna group. For example, in FIG. 4, as 4 transmission antennas are classified into 2 transmission antenna groups, the multiplexer 410 outputs 2 signal streams. A first signal stream classified by the multiplexer 410 is delivered to the first AMC unit 412, and a second signal stream classified by the multiplexer 410 is delivered to the second AMC unit 414.

The first AMC unit 412 performs power control and AMC control on the first signal stream using power control and AMC control information from the feedback information processor 304 (FIG. 3), and spreads the controlled first signal stream. Similarly, the second AMC unit 414 performs power control and AMC control on the second signal stream using power control and AMC control information from the feedback information processor 304 (FIG. 3), and spreads the controlled second signal stream. The power control and AMC control information provided from the feedback information processor 304 (FIG. 3) is determined depending on the feedback information from the mobile station. The signal streams from the first AMC unit 412 and the second AMC unit 414 are delivered to the switching unit 416.

The switching unit 416 includes a first switch and a second switch. The first switch connects the first AMC unit 412 to the first transmission antenna group 418 or the second transmission antenna group 420 according to a group selection signal. Similarly, the second switch connects the second AMC unit 414 to the first transmission antenna group 418 or the second transmission antenna group 420 according to the group selection signal. The first transmission antenna group 418 includes a first transmission antenna ANT#1 and a second transmission antenna ANT#2, and the second transmission antenna group 420 includes a third transmission antenna ANT#3 and a fourth transmission antenna ANT#4. Herein, the transmission antennas are classified such that transmission antennas in the same transmission antenna group suffer minimum interference from each other. The first AMC unit 412 is connected to the first transmission antenna ANT#1 in the first transmission antenna group 418 and the third transmission antenna #3 in the second transmission antenna group 420 via the first switch. The second AMC unit 414 is connected to the second transmission antenna ANT#2 in the first transmission antenna group 418 and the fourth transmission antenna #4 in the second transmission antenna group 420 via the second switch.

The switching unit 416 is controlled according to a group selection signal from the feedback information processor 304. The number of bits of the group selection signal is determined depending on the number of the transmission antenna groups. It is assumed in FIG. 4 that four transmission antennas are provided and are classified into two transmission antenna groups. Therefore, the group selection signal can be comprised of 1 bit used for selecting one of the two transmission antenna groups. If there are three or four transmission antenna groups, a 2-bit group selection signal is required. However, the number of transmission antennas constituting each transmission antenna group does not affect the number of bits of the group selection signal. The group selection signal is determined depending on the feedback information from the mobile station.

For example, if a group selection signal of '1' is received, the first switch and the second switch become an On-state. In this case, outputs of the first AMC unit 412 and the second AMC unit 414 are provided to the first transmission antenna group 418. Specifically, an output of the first AMC unit 412 is provided to the first transmission antenna ANT#1, and an output of the second AMC unit 414 is provided to the second transmission antenna ANT#2.

However, if a group selection signal of '0' is received, the first switch and the second switch become an Off-state. In this case, outputs of the first AMC unit 412 and the second AMC unit 414 are provided to the second transmission antenna group 420. Specifically, an output of the first AMC unit 412 is provided to the third transmission antenna ANT#3, and an output of the second AMC unit 414 is provided to the fourth transmission antenna ANT#4.

A detailed description will now be made of a method for generating feedback information and transmitting the generated feedback information in a reception side (i.e. mobile station) according to the first embodiment of the present invention.

A received signal y(t) is defined by Equation 1.

$$y(t) = \sqrt{\frac{E_s}{N_t}} H(t) x(t) + n(t) \quad (1)$$

$$= \sqrt{\frac{E_s}{N_t}} H(t) W(t) s(t) + n(t)$$

where H(t) denotes an $M_r \times M_t$ MIMO channel matrix transmitted from a base station (or Node B), s(t) denotes an $M_t \times 1$ transmitted symbol vector, n(t) denotes an $M_r \times 1$ additive white Gaussian noise (AWGN) vector with distribution $CN(0,N_0/2I_{Mr})$ for each element, W(t) denotes a matrix used for beamforming transmission, x(t) denotes a signal vector transmitted by a beamformer (x(t)=W(t)s(t))), and y(t) denotes an $M_r \times 1$ received symbol vector (t: an index of a timeslot).

Using the received signal y(t), the mobile station finds a weight matrix provided for obtaining of the maximum throughput or the maximum amount of transmission data in a multi-antenna system. The mobile station transmits an index indicating the weight matrix to the base station as feedback information. The generalized weight matrix is defined by Equation 2.

$$W(t) = W_{k_o}, \text{ where } k_o = \arg\max_k C_k(t) \quad (2)$$

where W(t) denotes a weight matrix to be used for beamforming, $W_{k_0}$ denotes a weight matrix selected depending on feedback information, and $k_0$ denotes an index of a weight matrix for maximizing throughput $C_k(t)$. Therefore, the mobile station determines the $k_0$ and, provides the $k_0$ to the base station as feedback information. The base station determines a weight matrix to be used, depending on the $k_0$.

The mobile station should be able to calculate throughput $C_k(t)$ for each individual weight matrix that can be used to determined $k_0$. The generalized throughput is defined by Equation 3.

$$C_k(t) = \sum_{m=0}^{M_t-1} c_f(\gamma_{m,k}(t)) \quad (3)$$

where $$\gamma_{m,k}(t) = \frac{E_s}{N_0 M_t [G_{m,k}(t)]_{mm}} - 1$$

denotes a signal-to-noise ratio, and $c_f(x)$ denotes a capacity function depending on the running system (e.g., $c_f(x)=\log_2(1+x)$).

In order to calculate a signal-to-noise ratio $\gamma_{m,k}(t)$ used in Equation (3), $G_{m,k}(t)$ must be calculated. When applying a successive interference cancellation (SIC) technique, the mobile station calculates a parameter $G_{m,k}(t)$ used for canceling a noise component from the y(t). The $G_{m,k}(t)$ is a parameter necessarily required by the reception side to apply the SIC technique, and can be calculated by Equation 4.

$$G_{m,k}(t) = \left(\hat{H}_{m,k}^H(t) \hat{H}_{m,k}(t) + N_0/E_s I_{M_t-m}\right)^{-1} \quad (4)$$

where $I_{M_t-m}$ denotes an $M_t$ m dimension square identity matrix, and $\hat{H}_{i,k}(t)$ denotes a deflated version of the beamformed channel matrix and is defined as $\hat{H}_k(t)=H(t)W_k$.

In the foregoing manner, the mobile station determines a weight index $k_0$ indicating a weight matrix with which the maximum throughput can be obtained, and transmits the determined weight index $k_0$ to the base station. The $k_0$ can be used as a group selection signal for selecting a transmission antenna group in the base station.

The base station has all of the weight matrixes that can be selected by the weight index $k_0$. The weight matrixes are defined by Equation 5.

$$W(t) \in \{W_1, W_2\} = \left\{\begin{bmatrix} 1 & 0 \\ 0 & 1 \\ 0 & 0 \\ 0 & 0 \end{bmatrix}, \begin{bmatrix} 0 & 0 \\ 0 & 0 \\ 1 & 0 \\ 0 & 1 \end{bmatrix}\right\} \quad (5)$$

As shown in Equation (5), one of two matrixes can be selected depending on the feedback information from the mobile station.

If $k_0=1$ is provided from the mobile station as feedback information, a first matrix $W_1$ is selected. When the first matrix $W_1$ is selected, a weight '1' is provided for the first transmission antenna group and a weight '0' is provided for the second transmission antenna group. That is, a weight '1' is input for a path connected to the ANT#1 via the first switch and a path connected to the ANT#2 via the second switch, and a weight '0' is input for a path connected to the ANT#3 via the first switch and a path connected to the ANT#4 via the second switch. Therefore, outputs from the first AMC unit 412 and the second AMC unit 414 are input to the first transmission antenna group including the ANT#1 and the ANT#2.

If $k_0=2$ is provided from the mobile station as feedback information, a second matrix $W_2$ is selected. When the second matrix $W_2$ is selected, a weight '0' is provided for the first transmission antenna group and a weight '1' is provided for the second transmission antenna group. That is, a weight '0' is input for a path connected to the ANT#1 via the first switch and a path connected to the ANT#2 via the second switch, and a weight '1' is input for a path connected to the ANT#3 via the first switch and a path connected to the ANT#4 via the second switch. Therefore, outputs from the first AMC unit 412 and the second AMC unit 414 are input to the second transmission antenna group including the ANT#3 and the ANT#4.

Although the present invention has been described for $k_0=1$ and $k_0=2$, $k_0=0$ and $k_0=1$ can be defined to use 1-bit group selection signal. In the foregoing embodiment, indexes of the weight matrixes are not used as feedback information. However, the group selection can also be implemented using a group selection bit. That is, if a group selection bit of '0' is provided, the switching unit is turned Off, selecting the second transmission antenna group, and if a group selection bit of '1' is provided, the switching unit is turned On, selecting the first transmission antenna group.

A second embodiment of the present invention provides an apparatus and method for classifying a plurality of transmission antennas into a plurality of transmission antenna groups, and allocating different weights to the transmission antenna groups depending on feedback information, thereby performing beamforming. In addition, the second embodiment provides a method for generating the feedback information used for allocating separate weights to the transmission antenna groups.

Figure 5:
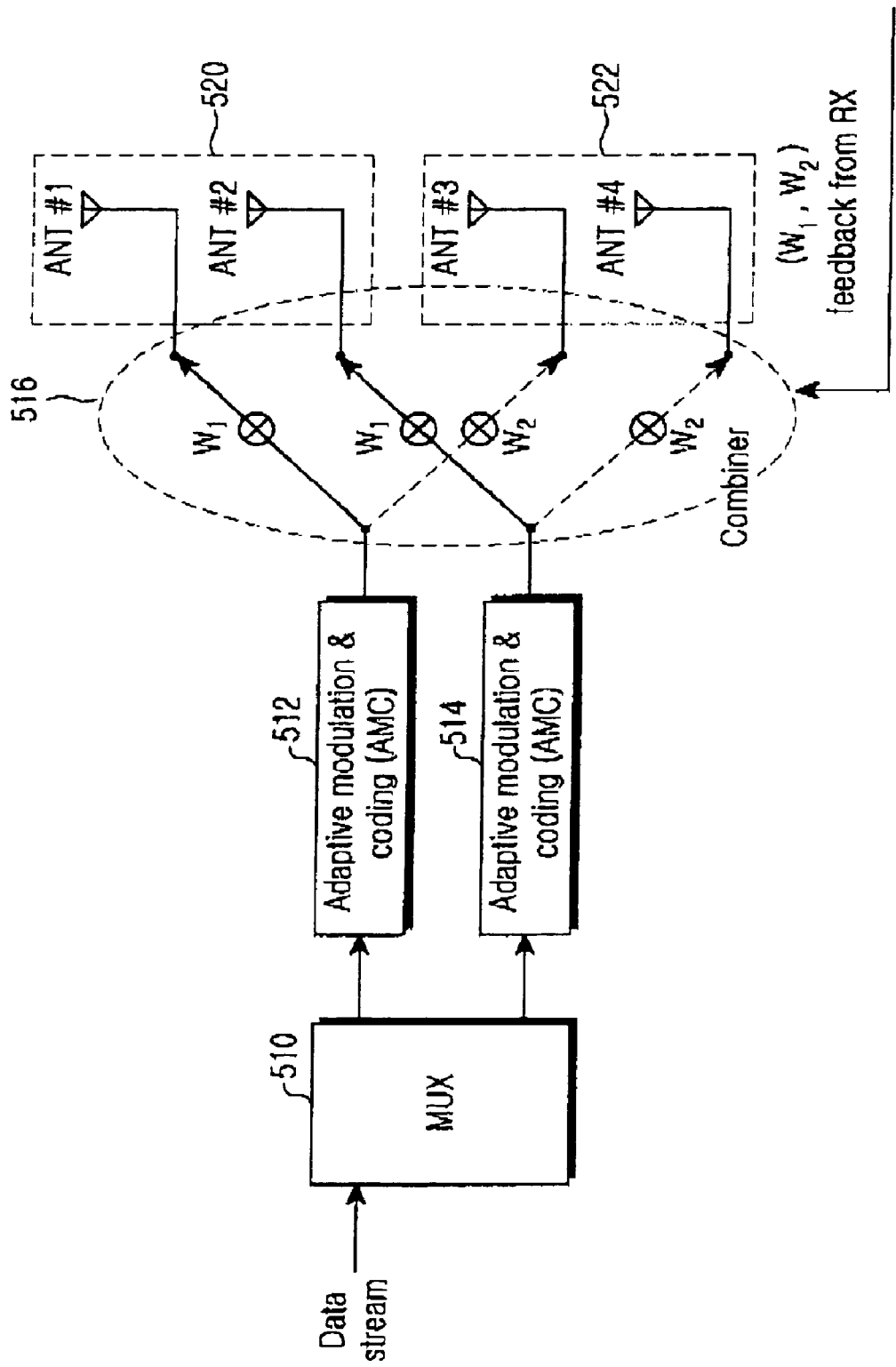
FIG. 5 illustrates a detailed structure of a signal transmitter for allocating separate weights to transmission antenna groups, through which signal streams will be transmitted, depending on feedback information.

FIG. 5 is a diagram illustrating a detailed structure of a signal transmitter 302 (FIG. 3) for allocating separate weights to transmission antenna groups, through which signal streams will be transmitted, depending on feedback information. The structure of FIG. 5 can be roughly divided into a general signal processor and a spatial signal processor. The general signal processor includes a multiplexer (MUX) 510 and two AMC units 512 and 514, and the spatial signal processor includes two combiners 516 and 518, and transmission antenna groups 520 and 522.

Referring to FIG. 5, a data stream to be transmitted is input to the multiplexer 510. The multiplexer 510 classifies the data stream into at least two signal streams. The number of signal streams output from the multiplexer 510 corresponds to the number of AMC units. The number of AMC units corresponds to the number of transmission antennas of one transmission antenna group. For example, in FIG. 5, as 4 transmission antennas are classified into 2 transmission antenna groups, the multiplexer 510 outputs 2 signal streams. A first signal stream classified by the multiplexer 510 is delivered to the first AMC unit 512, and a second signal stream classified by the multiplexer 510 is delivered to the second AMC unit 514.

The first AMC unit 512 performs power control and AMC control on the first signal stream using power control and AMC control information from the feedback information processor 304 (FIG. 3), and spreads the controlled first signal stream. Similarly, the second AMC unit 514 performs power control and AMC control on the second signal stream using power control and AMC control information from the feedback information processor 304 (FIG. 3), and spreads the controlled second signal stream. The power control and AMC control information is determined depending on the feedback information from the mobile station. The signal streams from the first AMC unit 512 and the second AMC unit 514 are delivered to the first combiner 516 and the second combiner 518.

The first combiner 516, matched to the first transmission antenna group 520, multiplies signal streams from the first AMC unit 512 and the second AMC unit 514 by a weight $W_1$ allocated thereto. The signal streams output from the first combiner 516 are input to the first transmission antenna ANT#1 and the second transmission antenna ANT#2 of the first transmission antenna group.

The second combiner 518, matched to the second transmission antenna group 522, multiplies signal streams from the first AMC unit 512 and the second AMC unit 514 by a weight $W_2$ allocated thereto. The signal streams output from the first combiner 518 are input to the third transmission antenna ANT#3 and the fourth transmission antenna ANT#4 of the second transmission antenna group.

As described above, the second embodiment of the present invention allocates different weights $W_1$ and $W_2$ to the transmission antenna groups, which are determined by the feedback information processor 304 (FIG. 3) depending on the feedback information from the mobile station. The feedback information processor 304 (FIG. 3), together with the mobile station, predefines the weights available in the base station, in order to determine the weights. The feedback information processor 304 (FIG. 3) selects weights corresponding to weight index information provided from the mobile station, and delivers the selected weights to the first and second combiners 516 and 518.

In the base station, the feedback information processor 304 (FIG. 3) can be implemented such that it can calculate different weights to be allocated to the transmission antenna groups depending on the weight index information k. An example of a weight matrix pattern predefined between a base station and a mobile station to allocate different weights to the transmission antenna groups is shown by Equation 6.

$$W(t) \in \left\{ \begin{bmatrix} w_1 & 0 \\ 0 & w_1 \\ w_2 & 0 \\ 0 & w_2 \end{bmatrix} \middle| w_1, w_2 \in C \right\} \quad (6)$$

As can be understood from the weight matrix shown in Equation (6), the same weights are allocated to the transmission antennas belonging to the same transmission antenna group.

Equation (7) below proposes an exemplary method of calculating $W_1$ and $W_2$ required for completing the weight matrix.

$$(w_1, w_2) \in \left\{ \left( \frac{1}{\sqrt{2}}, \frac{e^{j\pi k/2}}{\sqrt{2}} \right) \middle| k = 0 \ldots 3 \right\} \quad (7)$$

According to Equation (7), $W_1$ has a fixed value and $W_2$ is defined depending on the weight index information k provided as feedback information. As the weight index information has a value of 0 through 3, two bits are used to transmit the weight index information.

The mobile station determines an optimal weight set in accordance with Equation (7). The mobile station delivers a weight index k used for obtaining the optimal weight set by the base station as feedback information.

The base station determines a weight matrix to be used, depending on the 2-bit weight index information, and provides the determined weight matrix to the combiners 516 and 518, thereby providing unique weights to the transmission antenna groups.

A third embodiment of the present invention provides an apparatus and method for allocating separate weights to transmission antennas depending on feedback information, thereby performing beamforming. In addition, the third embodiment provides a method for generating the feedback information used for allocating separate weights to the transmission antennas.

Figure 6:
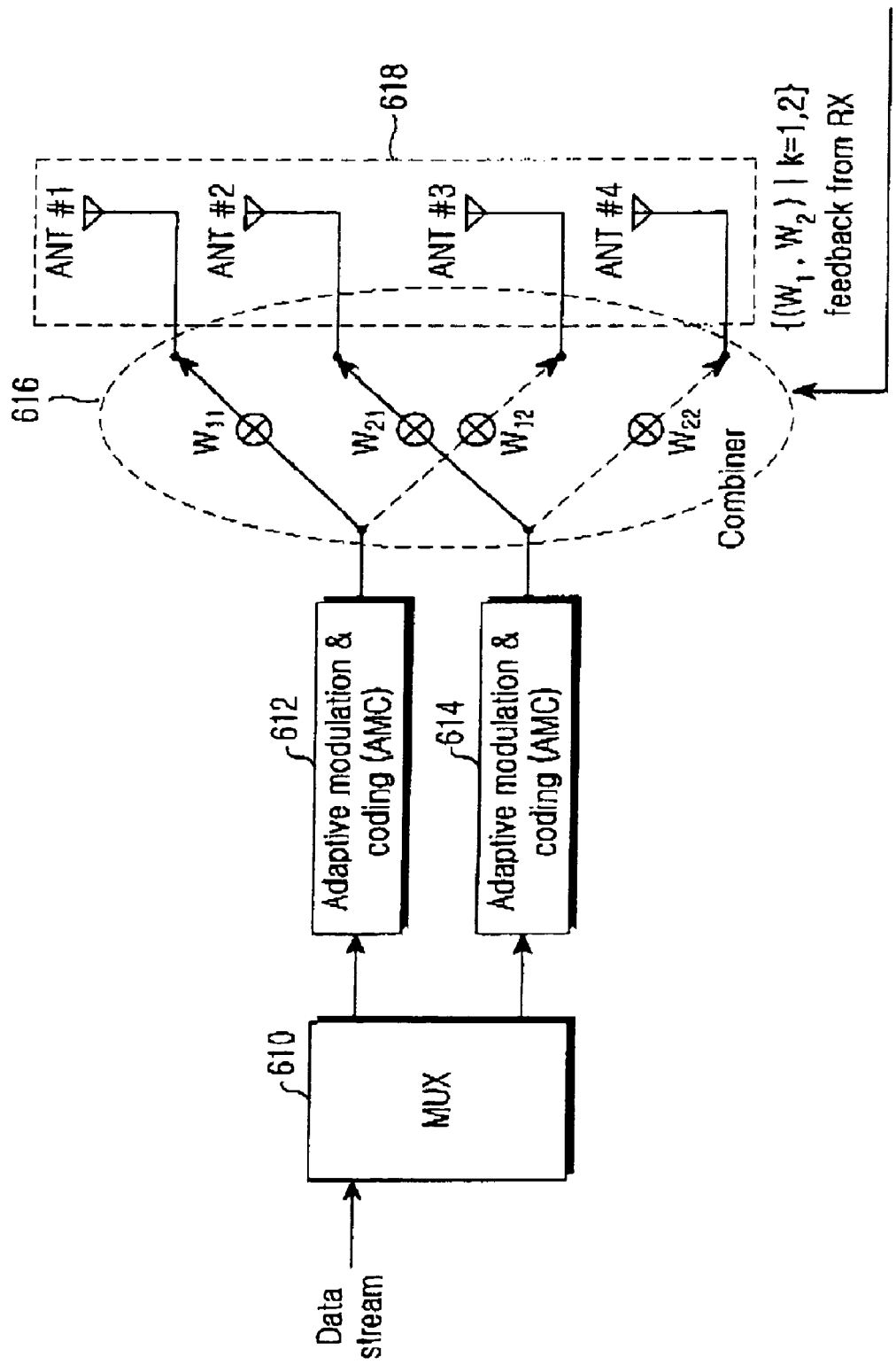
FIG. 6 illustrates a detailed structure of a signal transmitter for allocating separate weights to transmission antennas, through which signal streams will be transmitted, depending on feedback information.

FIG. 6 illustrates a detailed structure of a signal transmitter 302 (FIG. 3) for allocating separate weights to transmission antennas, through which signal streams will be transmitted, depending on feedback information. The structure of FIG. 6 can be roughly divided into a general signal processor and a spatial signal processor. The general signal processor includes a multiplexer (MUX) 610 and two AMC units 612 and 614, and the spatial signal processor includes one combiner 616 and transmission antennas 618 (ANT#1, ANT#2, ANT#3 and ANT#4). The third embodiment is similar to the first and second embodiments in terms of an operation of the general signal processor, so a detailed description thereof will be omitted.

Referring to FIG. 6, the combiner 616 multiplies signals streams from the first AMC unit 612 by different weights $W_{11}$ and $W_{12}$, and delivers the resultant signal streams to their associated transmission antennas ANT#1 and ANT#3. Further, the combiner 616 multiplies signals streams from the second AMC unit 614 by different weights $W_{21}$ and $W_{22}$, and delivers the resultant signal streams to their associated transmission antennas ANT#2 and ANT#4.

The weights $W_{11}$, $W_{21}$, $W_{12}$, and $W_{22}$ in the combiner 616 are determined by the feedback information processor 304 (FIG. 3) depending on the feedback information from the mobile station. The feedback information processor 304 (FIG. 3), together with the mobile station, predefines a weight matrix to be used in the base station, in order to determine the weights $W_{11}$, $W_{21}$, $W_{12}$, and $W_{22}$. The feedback information processor 304 (FIG. 3) calculates the weights $W_{11}$, $W_{21}$, $W_{12}$, and $W_{22}$ depending on the feedback information provided from the mobile station. The feedback information processor 304 (FIG. 3) controls an operation of the combiner 616 depending on the weight matrix in which the calculated weights $W_{11}$, $W_{21}$, $W_{12}$, and $W_{22}$ are reflected. The weight index information is comprised of k1 and k2, each of which is expressed with 2 bits. Therefore, in the third embodiment of the present invention, 4-bit weight index information is used as feedback information.

Figure 7:
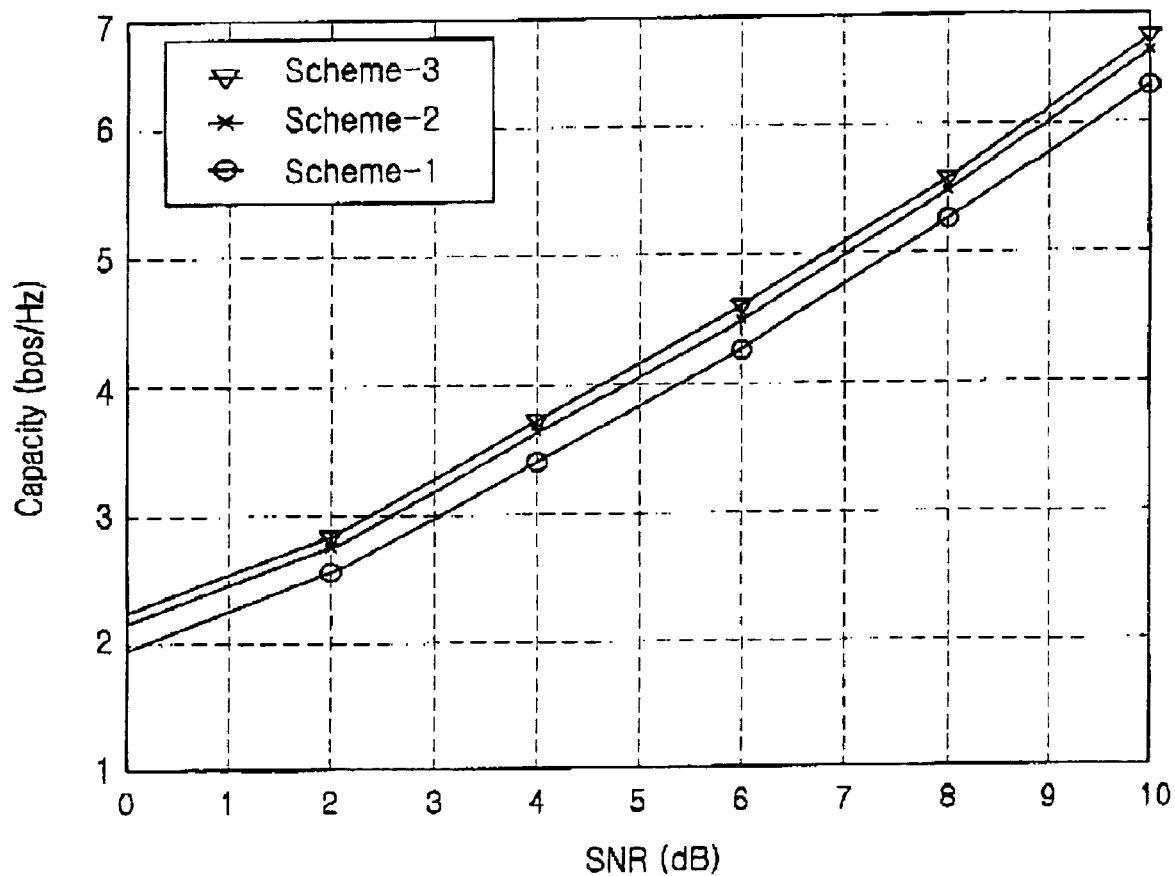
FIG. 7 is a graph showing performance of each of first to third embodiments of the present invention.

FIG. 7 graphs performance of each of the first to third embodiments of the present invention. It can be noted from FIG. 7 that the embodiments of the present invention are very similar to each other in terms of performance. However, the third embodiment shows the best performance.

As can be understood from the foregoing description, the novel mobile communication apparatus and method in which a mobile station including multiple reception antennas and a base station including multiple transmission antennas are considered, performs grouping-based beamforming by multiplying each signal stream group by the same weight vector using weights in which a downlink characteristic of a multi-antenna, multipath channel, being fed back from the mobile station to the base station is reflected. This process maximizes the amount of transmission data based on a Multiple Input Multiple Output (MIMO) interference cancellation principle in which interference between signal stream groups is processed by the multiple reception antennas of the mobile station, while minimizing the amount of feedback information by reducing the number of received feedback weight vectors to one. In particular, when the mobile station uses an improved reception technique such as the SIC technique, the effect is excellent.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for performing beamforming in a base station using a multi-antenna scheme, the apparatus comprising:

a general signal processor for multiplexing one bit steam into a plurality of bit streams, and performing Adaptive Modulation and Coding (AMC) on each of the plurality of bit streams; and a spatial signal processor for allocating weights to a plurality of transmission antennas of the base station depending on weight selection information being fed back from a mobile station, multiplying the plurality of bit streams by weights allocated to corresponding transmission antennas, respectively, and outputting the plurality of bit streams multiplied by the weights to the corresponding transmission antennas in each of a plurality of transmission antenna groups; and a feedback information processor for separately calculating weights for the plurality of transmission antenna groups depending on the weight selection information k being fed back from the mobile station, by:

$$(w_1, w_2) \in \left\{ \left( \frac{1}{\sqrt{2}}, \frac{e^{j\pi k/2}}{\sqrt{2}} \right) \middle| k = 0 \ldots 3 \right\},$$

wherein w1 is a weight corresponding to one of the plurality of transmission antenna groups and w2 is a weight corresponding to another one of the plurality of transmission groups, wherein the weight selection information includes weights of the plurality of transmission antennas groups, wherein the plurality of transmission antennas is classified into the plurality of transmission antenna groups, and wherein all of the antennas within each antenna group are allocated the same weight.

2. The apparatus of claim 1, wherein the spatial signal processor allocates different weights to different transmission antenna groups.

3. The apparatus of claim 1, wherein the general signal processor comprises:

a multiplexer for multiplexing the one bit stream into the plurality of bit streams; and a plurality of AMC units for performing AMC on each of the bit streams depending on feedback information from the mobile station.

4. The apparatus of claim 1, wherein the spatial signal processor further comprises:

a combiner for receiving a weight uniquely allocated to each of the transmission antenna groups, multiplying the plurality of bit streams by the weight uniquely allocated to each of the transmission antenna groups, and outputting the bit streams to their associated transmission antenna group.

5. The apparatus of claim 1, wherein transmission antennas, interference between which can be minimized, among a plurality of transmission antennas, are classified as one transmission antenna group.

6. The apparatus of claim 4, wherein the number of the transmission antennas is four, and the four transmission antennas are classified into two transmission antenna groups.

7. The apparatus of claim 4, wherein the number of the bit streams is in proportion to the number of transmission antennas constituting each transmission antenna group.

8. A method for performing beamforming for transmitting a plurality of bit streams output through Adaptive Modulation and Coding (AMC) via a plurality of transmission antennas in a base station using a multi-antenna scheme, the method comprising the steps of:

receiving feedback information from a mobile station;

acquiring weight selection information from the feedback information, and allocating weights to each of the plurality of transmission antennas depending on the weight selection information; and multiplying the plurality of bit streams by weights allocated to corresponding transmission antennas respectively; and outputting the plurality of bit streams multiplied by the weights to the corresponding transmission antennas in each of a plurality of transmission antenna groups, wherein the weight selection information includes weights of the plurality of transmission antenna groups, wherein the plurality of transmission antennas is classified into the plurality of transmission antenna groups, wherein all of the antennas within each antenna group are allocated the same weight, wherein the weights allocated to the transmission antenna groups are different from each other, wherein the allocation of the weights to the transmission antennas comprises:

acquiring the weight selection information from the feedback information;

selecting a predetermined weight matrix depending on the weight selection information; and allocating the weights to the transmission antennas according to the selected weight matrix, and wherein the weight matrix has a pattern defined as $$W(t) \in \left\{ \begin{bmatrix} w_1 & 0 \\ 0 & w_1 \\ w_2 & 0 \\ 0 & w_2 \end{bmatrix} \middle| w_1, w_2 \in C \right\}$$

and weights $W_1$ and $W_2$ for the transmission antenna groups in the weight matrix are determined by $$(w_1, w_2) \in \left\{ \left( \frac{1}{\sqrt{2}}, \frac{e^{j\pi k/2}}{\sqrt{2}} \right) \middle| k = 0 \ldots 3 \right\}$$

where k denotes weight selection information, and t denotes an index of a timeslot.

9. The method of claim 8, wherein the allocation of the weights to the transmission antennas comprises acquiring the weight selection information from the feedback information and allocating the weights to the transmission antenna groups depending on the weight selection information.

10. The method of claim 9, wherein the allocation of the weights to the transmission antennas comprises:

acquiring the weight selection information from the feedback information;

selecting a predetermined weight matrix depending on the weight selection information; and allocating the weights to the transmission antennas according to the selected weight matrix.

* * * * *